United States Patent

Zykov et al.

[15] 3,675,087
[45] July 4, 1972

[54] ELECTROLYTIC CAPACITOR AND A METHOD OF MANUFACTURING THE SAME

[72] Inventors: Vladimir Pavlovich Zykov, ulitsa Bljukhera, 43, kv. 51; Alexei Alexandrovich Panov, ulitsa Kirova, 76, kv. 73; Pavel Alexeevich Prudnikov, ulitsa Vatutina, 33/2, kv. 12; Mikhail Ivanovich Khlopin, ulitsa B. Bogatkova, 25, kv. 47; Alexel Dmitrievich Shlyapnikov, ulitsa Sakko-Vantsetti, 52, kv. 55, all of Novosibirsk, U.S.S.R.

[22] Filed: April 19, 1971

[21] Appl. No.: 135,026

[30] Foreign Application Priority Data

April 20, 1970 U.S.S.R..........................1423255

[52] U.S. Cl................................................317/230, 29/570
[51] Int. Cl................................................................H01g 9/05
[58] Field of Search....................................317/230, 231, 233

[56] References Cited

UNITED STATES PATENTS

| | | | |
|---|---|---|---|
| 3,066,247 | 11/1962 | Robinson | 317/230 |
| 3,054,029 | 9/1962 | Wagner et al. | 317/230 |
| 3,100,329 | 8/1963 | Sherman | 317/230 X |
| 3,254,390 | 6/1966 | Shtasel | 317/230 X |

*Primary Examiner*—James D. Kallam
*Attorney*—Holman & Stern

[57] ABSTRACT

In an electrolytic capacitor having a positive and a negative electrode separated by a dielectric layer, the negative electrode is electrically connected to the current collector thereof via a contact conductor, the contact conductor (contact electrode) being a film formed from a mixture of carbon black, graphite and polymerized thermosetting resin. The contact electrode is manufactured by preparing a suspension comprising carbon black, graphite, thermosetting resin and a solvent for said resin, followed by applying the resulting suspension onto the negative electrode surface and carrying out suspension coat drying at a temperature that provides for resin polymerization and solvent removal.

3 Claims, 1 Drawing Figure

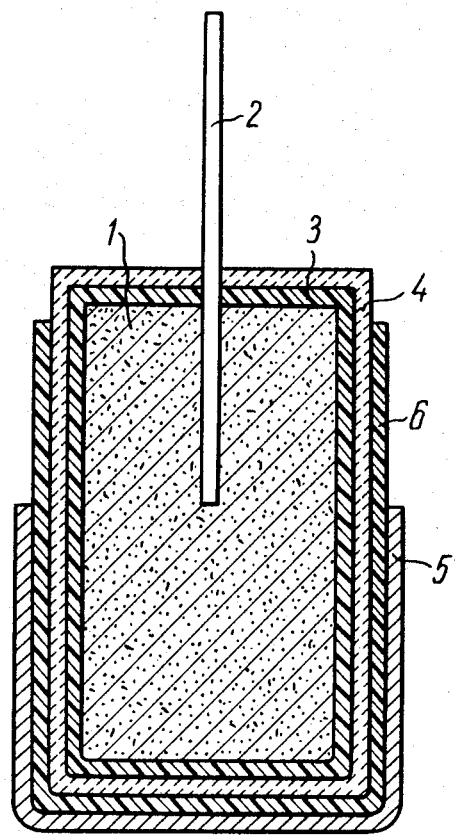

ELECTROLYTIC CAPACITOR AND A METHOD OF MANUFACTURING THE SAME

This invention relates to improvements in capacitors and, more specifically, to solid electrolytic capacitors.

An electrolytic capacitor is known to incorporate a positive electrode and a negative electrode separated by a dielectric material (electrolyte). The positive electrode is generally fabricated from a film-forming metal powder, foil or gauze which is oxidized to yield a metal oxide layer, which oxide layer exhibits insulating properties and serves as the dielectric film, while the negative electrode comprises a semiconducting oxide deposited on the dielectric film by the pyrolysis of an oxygen acid metal salt, e.g., manganese nitrate. Next, an aqueous colloidal solution of graphite is deposited onto the semiconducting oxide surface and thereafter dried to yield a contact conductor (contact electrode), onto which contact conductor is applied a metal layer or metal paste to form a current collector. The resultant assembly is placed in a casing and sealed. In the known electrolytic capacitors, the use of a contact conductor prepared from an aqueous colloidal solution of graphite is resorted to, but this results in marked leakage currents which arise due to weak adhesion between graphite particles in the colloidal solution, as well as due to the migration of graphite particles through the loose layer of the solid semiconducting oxide until they contact the oxide film (dielectric).

It is an object of the invention to minimize leakage current by the provision of a composition of and a deposition method for the contact conductor material which will exclude the migration of contact conductor particles through the solid semiconducting oxide layer and will impart to the contact conductor high conductivity and good adhesion to the solid semiconducting oxide.

To the attainment of this and other ends, a contact conductor, according to the present invention, comprising a film is prepared from a mixture of the following composition, percent by weight: carbon black, 25–30; graphite, 25–30; and polymerized thermosetting resin, 30–50.

The procedure employed for the fabrication of the contact conductor of the invention is as follows. A suspension is prepared from carbon black, graphite, a thermosetting resin and a suitable solvent for the resin. The resulting suspension is applied onto the surface of the solid semiconducting oxide and heated to a temperature which is adequate for causing resin polymerization and solvent removal.

The resin ingredient of the suspension acts as binder and retains carbon black and graphite particles, thereby preventing the migration of said particles through the porous layer of the semiconducting solid oxide (negative electrode). After the resin has polymerized, there forms on the negative electrode (semiconducting solid oxide) surface a thin film consisting of the polymerized resin, carbon black and graphite and exhibiting high mechanical strength and conductivity.

The method of the invention makes it possible to manufacture capacitors, in which leakage current is substantially below that of other prior art electrolytic capacitors, in which the contact conductor is prepared from an aqueous colloidal solution of graphite.

Optimum results accrue from the use of a suspension that contains graphite, carbon black, cresol-formaldehyde resin and a solvent taken in a proportion of 1:1:1.5:2, respectively.

The present invention is illustrated hereinbelow by the description of exemplary embodiments of the contact conductor, according to the invention, with reference to the accompanying drawing which shows a capacitor element.

The capacitor comprises a positive electrode 1 fabricated from any film-forming metals of any desired shape, structure or configuration and furnished with a current collector 2; a dielectric layer (film) 3; a negative electrode 4 consisting of a semiconducting oxide, e.g., $MnO_2$; a contact electrode 6; and a current collector 5 of the negative electrode 4.

The contact conductor 6 is a film containing 25–30 weight percent of carbon black, 25–30 weight percent of graphite, and 20–40 weight percent of plasticized thermosetting resin.

The methods of preparing the contact conductor, according to the invention, are described in the following examples.

EXAMPLE 1

A mixture of carbon black, graphite, cresol-formaldehyde resin and ethyl alcohol taken in an amount of 15, 15, 30 and 40 weight percent, respectively, is thoroughly ground in a ball mill at room temperature for a period of at least 24 hours until a finely divided composition is obtained. On the positive metal electrode 1 prepared from sintered aluminum particles which are oxidized to produce a dielectric film 3, there is deposited the negative electrode consisting of a solid semiconducting oxide ($MnO_2$) obtained by the pyrolysis of manganese nitrate ($Mn/NO_3/_2$). Next the surface of $MnO_2$ is coated with the suspension of carbon black, graphite, cresol-formaldehyde resin and ethyl alcohol, the suspension being either sprayed or applied by brush. The capacitor elements, after application of the suspension, are air dried at room temperature for at least 10 minutes, followed by applying the second layer of the suspension and repeating the aforedescribed drying procedure, whereupon the capacitor elements are placed in a thermostat and maintained therein at a temperature of 150°–180° C for at least 20 minutes. Resin polymerization and solvent evaporation occur at this temperature.

The next step consists in coating the surface of the contact conductor with a metal or metal paste layer to form current collector 5, and the finished capacitor elements are placed in a metal or insulating casing (not shown in the drawing), which is sealed or coated with a varnish.

EXAMPLE 2

A mixture of carbon black, graphite, cresol-formaldehyde resin taken in an amount of 20, 20, 25 and 35 weight percent, respectively, is prepared and applied onto capacitor elements by following the procedure of Example 1.

The capacitors prepared by the procedure of Example 1 display the parameters listed in Table 1.

| Voltage, V | Capacitance, mcF | Leakage current, mc A | Dielectric loss angle, % |
|---|---|---|---|
| 6.3 | 90–110 | 3–8 | 6–8 |
| 30 | 22–25 | 8–12 | 5–7 |

EXAMPLE 3

A mixture of carbon black, graphite, polymethylphenyl-siloxane resin and that solvent toluene taken in an amount of 20, 20, 25 and 35 weight percent, respectively, is prepared and applied onto capacitor elements by following the procedure of Example 1.

Capacitors with the positive electrode made from tantalum and niobium were prepared as described in Example 1.

The capacitors with the positive electrode made from aluminum tantalum and niobium are noted for their very low leakage currents, high performance reliability and long service life.

We claim:

1. An electrolytic capacitor comprising a positive electrode; a solid negative electrode made from a semiconducting oxide; a dielectric layer separating said positive electrode from said negative electrode, a contact conductor disposed on the surface of said negative electrode, said contact conductor being a film obtained from a mixture of 25–30 weight percent of carbon black, 25–30 weight percent of graphite and 30–50 weight percent of thermosetting resin; and a negative electrode current collector disposed on the contact conductor surface and made in the form of a metal film that contacts said contact conductor.

2. A method of manufacturing an electrolytic capacitor having a positive electrode, a negative electrode, a dielectric film therebetween and a contact conductor means disposed on the negative electrode surface, comprising: fabricating a positive electrode with a current collector; forming a dielectric film on a surface of the positive electrode; forming a negative electrode on the dielectric film; and forming a contact conductor means on the negative electrode surface by following the steps of preparing a suspension from carbon black, graphite, thermosetting resin and a solvent for said resin, applying said suspension on the negative electrode surface and drying the applied suspension at a temperature which is adequate for resin polymerization and solvent removal.

3. A method of claim 2 wherein the thermosetting resin is cresol-formaldehyde resin, and the ingredients for the contact conductor, i.e., carbon black, graphite, cresol-formaldehyde resin and solvent for said resin are taken in a proportion of 1:1:1.5:2, respectively.

* * * * *